(12) United States Patent
Oblotzki et al.

(10) Patent No.: US 8,349,424 B2
(45) Date of Patent: Jan. 8, 2013

(54) MULTILAYER SEAMLESS TUBULAR CASING BASED ON POLYAMIDE FOR MOLD COOKING

(75) Inventors: Jorg Oblotzki, Bad Salzuflen (DE); Heinrich Henze-Wethkamp, Walsrode (DE); Heiko Tamke, Bomlitz (DE)

(73) Assignee: Casetech GmbH, Bomlitz (DE)

( * ) Notice: Subject to any disclaimer, the term of this patent is extended or adjusted under 35 U.S.C. 154(b) by 757 days.

(21) Appl. No.: 12/444,387

(22) PCT Filed: Sep. 24, 2007

(86) PCT No.: PCT/EP2007/008268
§ 371 (c)(1),
(2), (4) Date: Jun. 25, 2009

(87) PCT Pub. No.: WO2008/040468
PCT Pub. Date: Apr. 10, 2008

(65) Prior Publication Data
US 2010/0047416 A1 Feb. 25, 2010

(30) Foreign Application Priority Data
Oct. 6, 2006 (DE) .......................... 10 2006 047 779

(51) Int. Cl.
*B29D 22/00* (2006.01)
*B29D 23/00* (2006.01)
*B32B 1/08* (2006.01)

(52) U.S. Cl. .................... 428/36.91; 428/34.8; 428/34.9; 428/35.7; 428/36.9; 428/36.6; 428/36.7; 428/474.4; 428/475.5; 428/475.8; 428/476.1; 428/476.3; 428/476.9; 428/500

(58) Field of Classification Search ................ 428/34.8, 428/34.9, 35.7, 36.9, 36.91, 36.6, 36.7, 474.4, 428/475.5, 475.8, 476.1, 476.3, 476.9, 500
See application file for complete search history.

(56) References Cited

U.S. PATENT DOCUMENTS

| | | |
|---|---|---|
| 3,330,669 A | 7/1967 | Hollenbeck |
| 3,508,944 A | 4/1970 | Henderson et al. |
| 3,528,825 A | 9/1970 | Doughty |
| 4,442,868 A | 4/1984 | Smith et al. |
| 4,446,167 A | 5/1984 | Smith et al. |
| 4,500,576 A | 2/1985 | Nicholson et al. |
| 4,604,309 A | 8/1986 | Goldberg |
| 4,975,209 A | 12/1990 | Welch et al. |
| 5,374,457 A | 12/1994 | Juhl et al. |
| 5,698,279 A | 12/1997 | Vicik |
| 5,992,345 A | 11/1999 | Lange et al. |
| 6,032,701 A | 3/2000 | Kearby et al. |
| 6,589,615 B1 | 7/2003 | Yen |
| 2001/0008658 A1 | 7/2001 | Barmore et al. |
| 2003/0031765 A1 | 2/2003 | Luthra et al. |
| 2004/0197583 A1 | 10/2004 | Samuels |
| 2004/0247752 A1 | 12/2004 | Koenig et al. |
| 2005/0129813 A1 | 6/2005 | Koenig et al. |
| 2006/0003058 A1 | 1/2006 | Koenig et al. |
| 2007/0154601 A1 | 7/2007 | Foegler et al. |
| 2007/0190210 A1 | 8/2007 | Koenig et al. |

FOREIGN PATENT DOCUMENTS

| | | |
|---|---|---|
| DE | 3029028 A1 | 2/1982 |
| DE | 195 00 470 A1 | 7/1996 |
| DE | 19846305 A1 | 4/2000 |
| DE | 10124581 A1 | 11/2002 |
| DE | 10208858 A1 | 9/2003 |
| DE | 10244088 A1 | 4/2004 |
| DE | 10344867 A1 | 4/2005 |
| DE | 10 2004 038 162 A1 | 3/2006 |
| EP | 127 296 A2 | 12/1984 |
| EP | 0 305 959 A2 | 3/1989 |
| EP | 0 338 365 | 10/1989 |
| EP | 0 408 164 A2 | 1/1991 |
| EP | 0 467 039 A2 | 1/1992 |
| EP | 0 530 549 A1 | 3/1993 |
| EP | 0559084 A2 | 9/1993 |
| EP | 0 603 678 A1 | 6/1994 |
| EP | 0 974 452 A2 | 1/2000 |
| EP | 0 981 963 A1 | 3/2000 |
| EP | 0 986 957 A1 | 3/2000 |
| EP | 0 992 194 A1 | 4/2000 |
| EP | 1439756 A1 | 7/2004 |
| EP | 1 820 404 A1 | 8/2007 |
| EP | 1911352 A1 | 4/2008 |
| WO | WO 03/028470 A1 | 4/2003 |
| WO | WO 2005/074691 A1 | 8/2005 |
| WO | WO 2006/015765 A1 | 2/2006 |

OTHER PUBLICATIONS

Bohm, L. and Fleissner 1998 "Metallocence polyolefine" *Kunststoffe* 88:1864-1874.
Bigg, D.M. et al. 1995 "Fundamentals of Melt Processing" in *Nylon Plastics Handbook*, , Editor Kohan, Melvin I., pp. 151-190.
Savic, Z. et al. 2002 "Man-made (synthetic) polymer casings" Chapter 7 in *Sausage Casings*, Vienna: Victus Lebensmittelbedarf, pp. 245-300.

*Primary Examiner* — Michael C Miggins
(74) *Attorney, Agent, or Firm* — Knobbe Martens Olson & Bear LLP

(57) ABSTRACT

The present invention relates to a coextruded, if appropriate biaxially stretched seamless multilayer tubular casing, and also to use thereof for encasing pasty or liquid goods, such as, for example, producing sausage in molds.

8 Claims, No Drawings

MULTILAYER SEAMLESS TUBULAR CASING BASED ON POLYAMIDE FOR MOLD COOKING

This application is U.S. National Phase of International Application PCT/EP2007/008268, filed Sep. 24, 2007 designating the U.S., and published in English as WO 2008/040468 on Apr. 10, 2008, which claims priority to German Patent Application No. 10 2006 047 779.0 filed Oct. 6, 2006.

The present invention relates to a coextruded, if appropriate biaxially stretched seamless multilayer tubular casing, and also to use thereof for encasing pasty or liquid goods, such as, for example, producing sausage in molds.

Depending on the goods to be produced, or to be packaged, a tubular casing must fulfill extensive specific properties in order to comply with the uses in practice. In sausage production, these can be, for example, high barrier properties against water vapor and oxygen, heat resistance up to sterilization temperature, defined adhesion to the filling, adequate shrinkage, high mechanical strength, dimensional stability, tautness, good peelability, good hot and cold slicing behavior, ease of fabrication, in particular shirrability, good colorability and color covering, good printability and reliable adhesion of printing ink, and also safety according to food law (EC Guidelines, Bundesinstitut fur Risikobewertung (BfR), Food and Drug Administration FDA) and ecological acceptability of the materials used.

In the field of application mold cooking requires, in addition, good tear propagation resistance during hot storage and slicing, protection of the surface against the penetration of dissolved substances, in particular those which cause discoloration, if appropriate good dippability, in particular cold and hot dippability, good shrinkage against crease formation and against deposition of jelly, and good elasticity for good demoldability.

Single- and multilayer casings which in part meet the abovementioned required features, have long been prior art and are amply known.

Tubular casings made of thermoplastics are widely available on the market and are distinguished by their good barrier properties. Savic, Z. (Sausage Casings, VICTUS Lebensmittelindustriebedarf, Vienna, Austria, pp. 245-300), and Kohan, Melvin I. (Nylon Plastics Handbook, Carl Hanser Verlag, Munich Vienna New York, 1995, pp. 151-190) disclose that for the production of such tubular casings the blown film method or the double-bubble method can be used.

EP-A 0 467 039 discloses that, for reducing the water vapor permeability, polyolefins can be used as core material. The stability of the casing is met by using aliphatic and/or partially aromatic polyamides or mixtures of these in the outer layers.

EP-A 0 603 678 describes a structure which provides a modified polyolefin as barrier layer. This structure is likewise characterized by an external polyamide layer.

These applications share the fact that polyamide is used in the outer layer facing away from the filling. Since polyamide is polar and can thus absorb water, as a result substances dissolved in water can in an undesired manner penetrate into the polyamide layer.

EP-A-0 305 959 describes a multilayer polyamide film which is provided, for example, in the form of a hot-sealable bag for packaging meat and poultry. It contains a barrier layer against oxygen and consists of a partially aromatic copolyamide. It is enclosed on both sides by polyolefin layers which form a water vapor barrier, wherein the inner layer is said to prevent the exit of water from the packaged food into the core layer of copolyamide. Pure homopolyolefin layers, however, are unsuitable as the inside for sausage casings, since they lead to inadequate adhesion between sausage mix and inner wall of the sausage casing, as a result of which the deposition of jelly is promoted.

EP-A 127 296 has already attempted to solve this problem. There it was proposed to provide an ionomer for the inside of a multilayer polyamide film and to treat the inside with ionizing radiation. Irradiation by corona discharge can, however, lead to blocking of the tube during the subsequent wind up, if no suitable countermeasures are taken.

A further solution for improving the barrier properties is described by EP-A 0 530 549. The barrier properties are achieved by a combination of an external polyolefin layer with a core layer based on EVOH and/or polyamide and a polyamide inner layer.

The film composites described here as the prior art, based on the above-described requirement profile, have deficits in individual points. In particular the requirements of low tendency to tear propagation and protection against the penetration of dirt into the outer material layers, are not compatible with the known casings on the market.

From the deficiency of the described film composites, there resulted the requirement to find a structure for an artificial food casing which firstly has an increased tear propagation strength and secondly minimizes the risk of dirt which can arise by the penetration of dissolved particles into the outer polymer layers, without having to apply a further protective coating, for example an additional lacquering.

This object has now been solved by a multilayer, biaxially stretched tubular film according to the description hereinafter.

The invention therefore relates to a multilayer, biaxially stretched tubular film comprising, in the following sequence orientated from outside to inside, A) a layer A based on polyethylene having a layer thickness of 1 to 15 µm,
B) a layer B, if appropriate made in a multilayer manner, comprising aliphatic and/or partially aromatic polyamides and/or copolyamides or mixtures thereof having a layer thickness of 3 to 30 µm,
C) layer C based on polyolefin having a layer thickness of 1 to 15 µm, and
D) a layer D having a layer thickness of 3 to 20 µm, comprising either aliphatic and/or partially aromatic polyamides, and/or copolyamides, or mixtures thereof or a layer based on polyolefin.

The layers A) and C), independently of one another, preferably have a thickness of 3 to 10 µm. Layer B) preferably has a thickness of 5 to 30 µm. Layer D) preferably has a thickness of 5 to 15 µm The total thickness of the tubular film according to the invention is 25 to 80 µm, preferably 30 to 60 µm.

The polyethylene-based layer A is preferably based on homopolymers or copolymers having ethylene units and if appropriate straight-chain alpha-olefin units having 4 to 8 carbon atoms.

The polyolefin layer C is preferably based on homopolymers or copolymers having ethylene, propylene and/or straight-chain alpha-olefin units having 3 to 8 carbon atoms, or a mixture of these units.

The polyolefin layers A) and C) are preferably modified with carboxylic acid and/or carboxylate groups, so that they have adhesion-promoting properties toward polyamide layers. Preferably, they therefore contain, in addition to the units originating from the abovementioned monomers, also such units which are obtained by incorporation by polymerization of $\alpha,\beta$-unsaturated mono- or dicarboxylic acid, such as acrylic acid, methacrylic acid, maleic acid, fumaric acid, itaconic acid, or acid anhydrides thereof, acid esters, acid amides or acid imides.

Aliphatic polyamides or copolyamides, as can be used in layers B) and D), are homo- or copolyamides of aliphatic primary diamines and aliphatic dicarboxylic acids, or homopolymers or copolymers of ω-amino-carboxylic acids or their lactams.

The abovementioned aliphatic primary diamines preferably contain 4 to 8 carbon atoms. Suitable diamines are tetra-, penta-, hexa- and octamethylene-diamine, particularly preferably hexamethylenediamine.

The aliphatic dicarboxylic acids preferably contain 4 to 12 carbon atoms. Examples of such suitable dicarboxylic acids are adipic acid, azelaic acid, sebacic acid and dodecanedicarboxylic acid.

The ω-aminocarboxylic acids or lactams thereof preferably contain 6 to 12 carbon atoms. One example of ω-aminocarboxylic acids is 11-aminoundecanoic acid. Examples of lactams are ε-caprolactam and ω-lauro-lactam.

Particularly preferred aliphatic polyamides are polycaprolactam (PA 6) and polyhexamethylene adipinamide (PA 66). A preferred aliphatic copolyamide is PA 6/66, which consists of caprolactam, hexamethylenediamine and adipic acid units.

The partially aromatic polyamides are based on the abovementioned aliphatic diamines and/or dicarboxylic acids, wherein aromatic groups can be incorporated both by aromatic diamines and also aromatic carboxylic acids.

Examples of suitable aromatic diamines are m-xylylenediamine and phenylenediamine.

Examples of suitable aromatic dicarboxylic acids are isophthalic acid and terephthalic acid.

A preferred partially aromatic copolyamide contains units derived from m-xylylenediamine and adipic acid. Such a polyamide (PA-MXD6) is distributed, for example, by the firm Mitsubishi Gas Chemical Company Inc., Tokyo, JP, under the name MX-Nylon.

A likewise preferred partially aromatic copolyamide has structures derived from hexamethylenediamine, isophthalic acid and terephthalic acid. Such a polyamide (PA 6I/6T) is distributed, for example, by DuPont De Nemours, Wilmington, Del., USA under the name Selar PA.

If PA 6I/6T is co-used, it is preferably used in amounts of 2 to 40% by weight per layer, particularly preferably 5 to 20% by weight.

If PA-MXD6 is co-used, it is preferably used in amounts of 5 to 40% by weight per layer, particularly preferably 10 to 30% by weight.

In addition, all layers can contain additives such as lubricants, antiblocking agents, nucleation agents, fillers or color pigments (etc.).

If, in layer D, a polyolefin is used, this is preferably based on homo-, co- or terpolymers having ethylene and/or straight-chain alpha-olefin units having 2 to 8 carbon atoms, in particular ethylene, propylene and butylene, or a mixture of these units, and also modified polyolefins having functional groups such as, for example, units of vinyl acetate, ethylenically unsaturated carboxylic acids such as acrylic acid and methacrylic acid, and also their esters and salts, in particular Na and Zn salts, in addition also ethylenically unsaturated carboxylic anhydride groups.

Production of the tubular film according to the invention proceeds via an extrusion method. The raw material present in fiber, granule or powder form is, for this, compacted in an extruder, melted, homogenized, and discharged via a die and shaped to form a seamless tube. The exiting primary tube is cooled by air or water cooling and subsequently simultaneously biaxially stretched. A particularly suitable method in this case is simultaneous biaxial stretching by means of double-bubble technology, in which the stretching of the primary bubble proceeds via an applied internal pressure. For targeted setting of the shrink properties, the casing can subsequently be subjected to a heat treatment. The shrinkage of the casing according to the invention at 100° C. water bath temperature is in the longitudinal and transverse direction 5-35%, preferably 10%-25%.

The tubular films according to the invention are outstandingly suitable as food casing, for example for the packaging of sausage, animal food, cheese, dough mixes and other pasty or liquid goods.

A preferred field of application of the tubular films according to the invention is mold cooking. Mold cooking is taken by those skilled in the art to mean cooking packaged and unpackaged foods with forced shaping. The molds in this case can have a geometrically defined shape or else can be produced by free-form surfaces. This method is used, for example, in pies or cooked ham.

EXAMPLES

Materials Used:

| | |
|---|---|
| PA6: | Durethan B40 FA, aliphatic polyamide, Lanxess, Leverkusen, DE |
| CoPA: | Ultramid C33 LN, aliphatic copolyamide based on polyamide 6 and polyamide 66, BASF AG, Ludwigshafen, DE |
| HV1: | Admer ® QF551 E, polyolefin based on carboxylic acid-containing polypropylene, Mitsui Chemicals Inc., Tokyo, JP |
| HV2: | Tymor ® 1228 B, polyolefin based on carboxylic acid-containing polyethylene, Rohm & Haas, Woodstock, IL, USA |
| HV3: | Bynel ® 50 E 662, polyolefin based on carboxylic acid-containing polypropylene, DuPont, Wilmington, Delaware, USA |
| HV4: | Admer ® NF 468 E, polyolefin based on carboxylic acid-containing polyethylene, Mitsui Chemicals Inc., Tokyo, JP |

Example 1 (E.1)

| | | |
|---|---|---|
| Layer D: (inner layer) | PA 6 | 6 μm |
| Layer C: | HV2 | 5 μm |
| Layer B2: | PA 6 | 6 μm |
| Layer B1: | CoPA | 20 μm |
| Layer A: (outer layer) | HV2 | 6 μm |

Example 2 (E.2)

| | | |
|---|---|---|
| Layer D: (inner layer) | PA 6 | 6 μm |
| Layer C: | HV2 | 5 μm |
| Layer B2: | PA 6 | 6 μm |
| Layer B1: | CoPA | 20 μm |
| Layer A: (outer layer) | HV4 | 6 μm |

Comparative Example 1 (C.1)

| Layer D: (inner layer) | PA 6 | 6 μm |
|---|---|---|
| Layer C: | HV2 | 5 μm |
| Layer B2: | PA 6 | 6 μm |
| Layer B1: | CoPA | 20 μm |
| Layer A: (outer layer) | PA 6 | 6 μm |

Comparative Example 2 (C.2)

| Layer D: (inner layer) | PA 6 | 6 μm |
|---|---|---|
| Layer C2: | HV2 | 5 μm |
| Layer B2: | PA 6 | 6 μm |
| Layer B1: | CoPA | 20 μm |
| Layer A: (outer layer) | HV1 | 6 μm |

Comparative Example 3 (C.3)

| Layer D: (inner layer) | PA 6 | 6 μm |
|---|---|---|
| Layer C: | HV2 | 5 μm |
| Layer B2: | PA 6 | 6 μm |
| Layer B1: | CoPA + 6% by wt. PBT | 20 μm |
| Layer A: (outer layer) | HV3 | 6 μm |

TABLE 1

Results of the tear propagation resistance test as specified in DIN 53363 multiple testing with same layer thickness

| Example | Direction | Maximum force [N], mean | Tear propagation resistance [N/mm], mean |
|---|---|---|---|
| E1 | longitudinal | 2.20 | 49.21 |
| C1 | longitudinal | 1.26 | 28.78 |
| C2 | longitudinal | 3.88 | 88.72 |
| C3 | longitudinal | 2.08 | 49.58 |
| E1 | transverse | 3.2 | 73.12 |
| C1 | transverse | 1.72 | 38.30 |
| C2 | transverse | 4.77 | 106.61 |
| C3 | transverse | 3.14 | 67.49 |

TABLE 2

Results of water vapor permeability (test protocol 4112/23° C./85% rh)

| Example | Sample 1 [g/m² · d] | Sample 2 [g/m² · d] | Mean [g/m² · d] |
|---|---|---|---|
| E1 | 5.49 | 5.49 | 5.49 |
| C1 | 7.15 | 7.30 | 7.23 |
| C2 | 6.36 | 6.37 | 6.37 |
| C3 | 5.70 | 5.69 | 5.70 |

TABLE 3

Analysis of the application studies by the school grades principle

| Example | Grade composite adhesion | Type of peeling | Grade | Type of peeling | Grade |
|---|---|---|---|---|---|
| E1 | 2 | longitudinal | 2 | spiral | 2 |
| E2 | 1-2 | longitudinal | 1-2 | spiral | 2 |
| C1 | 1-2 | longitudinal | 2 | spiral | 2 |
| C2 | 4 | longitudinal | 3 | spiral | 3 |
| C3 | 3-4 | longitudinal | 2-3 | spiral | 2-3 |

Composite adhesion: 1 = very good (strong composite adhesion) to 6 = unsatisfactory (complete delamination).
Peeling test 1 = very good (the skin can be peeled perfectly in any direction) to 6 = unsatisfactory (the skin does not follow the peeling direction)

Study of the Dye Penetration Behavior:

Using a dye reagent (Neocarmin W, Merck) as test liquid, which serves for detecting textile fibers, the penetration behavior of dirt into the outer layer was studied. The outside of the layer structure to be tested was treated with the test liquid for an exposure time of 30 seconds. Subsequently the surface was wiped with a dry cloth and the extent of the remaining discoloration was assessed visually.

The film composites of examples 1 and 2 according to the invention showed no discoloration in this case. They exhibited good composite adhesion both in spiral peeling as used in practice and also in peeling in the longitudinal direction, as shown in table 3. The comparative example C1 discolored markedly.

Film composites C2 and C3 displayed again no discoloration of the outer layer. Here, surprisingly the composite adhesion was not sufficient on peeling one sausage. The film delaminated between the outer layer and the next inner layer. This is therefore surprising, since the adhesion promoters of comparative examples 2 and 3 do not exhibit this weakness when used within a film composite.

As the above results of the application tests show, only the layer structures according to the invention having a polyethylene-based outer layer are able to provide good tear propagation resistance combined with low susceptibility to fouling (measured via the dye penetration test) and good composite adhesion.

The invention claimed is:
1. A multilayer, biaxially stretched tubular film comprising:
    A) a first outer layer A based on polyethylene having a layer thickness of 1 to 15 μm,
    B) an inner layer B made in a multilayer manner, comprising aliphatic and/or partially aromatic polyamide(s) and/or copolyamide(s) or mixtures thereof having a layer thickness of 3 to 30 μm,
    C) an inner layer C based on polyolefin having a layer thickness of 1 to 15 μm, and
    D) a second outer layer D having a layer thickness of 3 to 20 μm, comprising either aliphatic and/or partially aromatic polyamide(s), and/or copolyamide(s), or mixtures thereof, wherein, in use, the first outer layer A is configured to be oriented outside, and the second outer layer D is configured to be oriented inside.
2. The tubular film as claimed in claim 1, wherein the the layers A) and C) have a thickness of 3 to 10 μm, layer B) has a thickness of 5 to 30 μm, and layer D)has a thickness of 5 to 15 μm, wherein the total composite has a layer thickness of 30 to 60 μm.
3. The tubular film as claimed in claim 1, wherein the polyethylene-based layer A) is based on homopolymers or copolymers with ethylene units and optionally straight-chain alpha-olefin units having 4 to 8 carbon atoms.
4. The tubular film as claimed in claim 1, wherein the polyolefin layer C is based on homopolymers or copolymers having ethylene, propylene and/or straight-chain alpha-olefin units having 3 to 8 carbon atoms, or a mixture of these units.

5. The tubular film as claimed in claim 1, wherein the polyolefin layers A) and C) are modified with carboxylic acid and/or carboxylate groups.

6. The tubular film as claimed in claim 1, wherein in the layers B and D, the aliphatic polyamides(s) are poly-caprolactam (PA 6) or polyhexamethylene adipinamide (PA 66); the aliphatic copolyamide(s) are PA 6/66; or the partially aromatic copolyamide(s), have either m-xylylenediamine and adipic acid units, or hexamethylenediamine, isophthalic acid and terephthalic acid units.

7. A method of preparing food comprising the step of encasing food in the tubular films as claimed in claim 1.

8. The method of claim 7, further comprising the step of mold cooking.

* * * * *

UNITED STATES PATENT AND TRADEMARK OFFICE
CERTIFICATE OF CORRECTION

| | | |
|---|---|---|
| PATENT NO. | : 8,349,424 B2 | Page 1 of 1 |
| APPLICATION NO. | : 12/444387 | |
| DATED | : January 8, 2013 | |
| INVENTOR(S) | : Oblotzki et al. | |

It is certified that error appears in the above-identified patent and that said Letters Patent is hereby corrected as shown below:

At Title Page 1 Item [56], column 2, line 42, under Other Publications, please change "Metallocence" to --Metallocene--.

In the Specification

Column 2, line 50, please change "15 µm" to --15 µm.--.

Column 3, line 22, please change "adipinamide" to --adipamide--.

In the Claims

Column 6, line 57, in Claim 2, please change "wherein the the" to --wherein the--.

Column 6, line 59, in Claim 2, please change "D)has" to --D) has--.

Column 7, lines 7-8, in Claim 6, please change "1,wherein in the layers" to --1, wherein, in layers--.

Column 7, line 8, in Claim 6, please change "polyamides(s)" to --polyamide(s)--.

Column 7, line 9, in Claim 6, please change "adipinamide" to --adipamide--.

Signed and Sealed this
Twenty-sixth Day of November, 2013

Margaret A. Focarino
*Commissioner for Patents of the United States Patent and Trademark Office*